(12) United States Patent
Funke et al.

(10) Patent No.: US 6,478,916 B1
(45) Date of Patent: Nov. 12, 2002

(54) METHOD FOR THE MANUFACTURE OF A SECTION FOR WINDOWS OR DOORS

(75) Inventors: Norbert Funke; Rudolf Poljanac, both of Sendenhorst (DE)

(73) Assignee: Funke Kunstsoffe GmbH, Sendenhorst (DE)

(*) Notice: Subject to any disclaimer, the term of this patent is extended or adjusted under 35 U.S.C. 154(b) by 0 days.

(21) Appl. No.: 09/300,533

(22) Filed: Apr. 27, 1999

(30) Foreign Application Priority Data

Apr. 28, 1998 (DE) .......................... 198 19 009
Jul. 1, 1998 (DE) .......................... 198 29 460

(51) Int. Cl.[7] ............................. B29C 47/02
(52) U.S. Cl. ..................... 156/244.12; 156/244.13; 156/244.15
(58) Field of Search ............. 156/244.12, 244.13, 156/244.15, 244.11; 425/113, 114; 264/265, 271.1, 275, 279.1; 52/730.3, 730.4, 786.1, 788.1, 204.62; 29/897.312

(56) References Cited

U.S. PATENT DOCUMENTS

| | | |
|---|---|---|
| 4,383,812 A | 5/1983 | Calcagni |
| 4,428,156 A * | 1/1984 | Malm et al. ............ 52/730.4 |
| 5,497,594 A * | 3/1996 | Giuseppe et al. ........ 52/730.4 |

FOREIGN PATENT DOCUMENTS

| | | |
|---|---|---|
| DE | 27 45 846 | 4/1978 |
| DE | G 80 01 783 | 3/1981 |
| DE | 3 024 107 | 6/1981 |
| DE | 29 715 346 | 12/1997 |
| EP | 0 014 498 | 8/1980 |
| EP | 0 26795 | 4/1981 |
| EP | 0737561 | 10/1996 |
| EP | 0 828 052 | 3/1998 |
| GB | 2 320 048 | 6/1998 |

OTHER PUBLICATIONS

Verfahrenstechnik 1979, p. 53 (Schock & Co.).

* cited by examiner

Primary Examiner—Geoffrey L. Knable
(74) Attorney, Agent, or Firm—Dilworth & Barrese LLP

(57) ABSTRACT

The invention relates to a method for the manufacture of a section for windows or doors having an external surface and an internal surface and having at least one web which separates a chamber between the external surface and the internal surface. In accordance with the invention, in this method the at least one web is extruded in a first extruder line and led after at least partial cooling into a tool forming the section in which tool then the at least one web is welded to the section.

27 Claims, 3 Drawing Sheets

METHOD FOR THE MANUFACTURE OF A SECTION FOR WINDOWS OR DOORS

BACKGROUND OF THE INVENTION

The invention relates to a method for the manufacture of a section for windows or doors having an external surface and an internal surface and at least one web which separates a chamber between the external and internal surfaces.

With windows and doors, it is generally desirable to achieve high thermal insulation and sound proofing. To do so, both the construction of the glass area and the design of the frame sections are of importance. The present invention relates specifically to the design of the sections used for this.

Hollow sections are known with thin-walled hard PVC webs. As a result of the chambers formed by the webs, air remains in the hollow section which has an insulating effect with regard to the abutting wall. The chambers are intended to effect thermal insulation from the outside with respect to the inside of the section. For window sections, for example, 3-chamber systems are usual; since very recently, high-quality window sections have been fitted with 4-chamber systems.

However, the fact is problematic that webs or the solid material of the webs allows thermal conduction between the chambers which is substantially higher than the thermal conduction of air. While higher thermal insulation could also be achieved through a plurality of chambers, the number of chambers which can be introduced into the section is limited by the external geometry and by further reinforcements made of steel to be introduced into the section. Furthermore, the introduction of further chambers incurs high costs so that the number of chambers should not be increased without limit for this reason, too.

A hollow section as described above is already known, for example, from EP 0 828 052 A2. It is already described there to introduce an insulation film into the correspondingly formed chambers in the section during the extrusion process of the hollow section. In this process, the insulation film stored on a reel is supplied through a corresponding opening in the extruder nozzle, whereby a non-positive connection is created between the soft plastic material and the insulation film.

In this process, in which the insulation film is drawn off a reel as a pre-fabricated material and supplied to the extruder forming the section, a sufficiently good welding may be possible with the section in the edge region of the insulation film thanks to the comparatively thin wall of the insulation film. With thicker films or thicker, wall-like webs, however, a secure welding is no longer ensured.

To remedy this, one could have the idea of connecting several extruder lines directly to a tool which, on the one hand, form the external covering for each section and, on the other hand, the web dividing the section. However, if both the external section portion and the web disposed on the inside of the section are formed in the tool, then the problem arises of a uniform cooling down of the extruded plastic even with comparatively low forming speeds. While a comparatively fast cooling down occurs in the outside section region, the heat from the inner web formed in the tool can only be dissipated insufficiently so that deformation and warping of the total section occur.

SUMMARY OF THE INVENTION

It is therefore the object of the invention to provide a method for the manufacture of a section for windows or doors in which sections for windows or doors of the type first described can be formed while achieving high forming speeds.

This object is solved in accordance with the invention beginning with a generic method by the combination with the features outlined below. In this, the following process steps are performed:

Extrusion of the at least one web with a first extruder line;

The at least partial cooling down of the at least one web exiting the extruder line;

Introduction of the at least one web into a tool for forming the section;

Formation of the section with an external and internal surface in the tool connected to a second extruder line; and Welding of the at least one web to the section part forming the external or internal surface in the tool during its exit from the tool.

By means of the method in accordance with the invention, the web exiting the first extruder line can be cooled so far prior to its entrance into the tool in which the external or internal surface of the outside section part is formed as is required, on the one hand, for a good weld in the edge region of the at least one web without, however, having to accept the problems of insufficient heat dissipation.

By means of this method, the usual forming speeds of complex window or door sections of the type first described can be at least doubled.

Preferred aspects of the method in accordance with the invention are produced as described below. According to these, the at least one web can be heated by the tool to a temperature at which the web still possesses sufficiently high stability to be welded to the section.

Furthermore, the at least one web can advantageously consist of a foamed material. With this, increased thermal insulation can be achieved simply without having to introduce even further additional webs or chambers to the window section.

For reasons of stability, it may be desirable to cool down the at least one web so far that welding is only possible with difficulty. Particularly for this application, it is provided in accordance with another aspect of the method to heat the edge region of the at least one web along which the latter should be welded so far that a good weld capability is achieved between the section part forming the external or internal surface and the at least one web.

Furthermore, instead of the one or more webs, a more complex interior section can also be weldable to the section part forming the external or internal surface.

BRIEF DESCRIPTION OF THE DRAWINGS

Further advantages and details of the invention are produced by the embodiment shown in the drawing in which.

DESCRIPTION OF THE PREFERRED EMBODIMENTS

Figure 1:
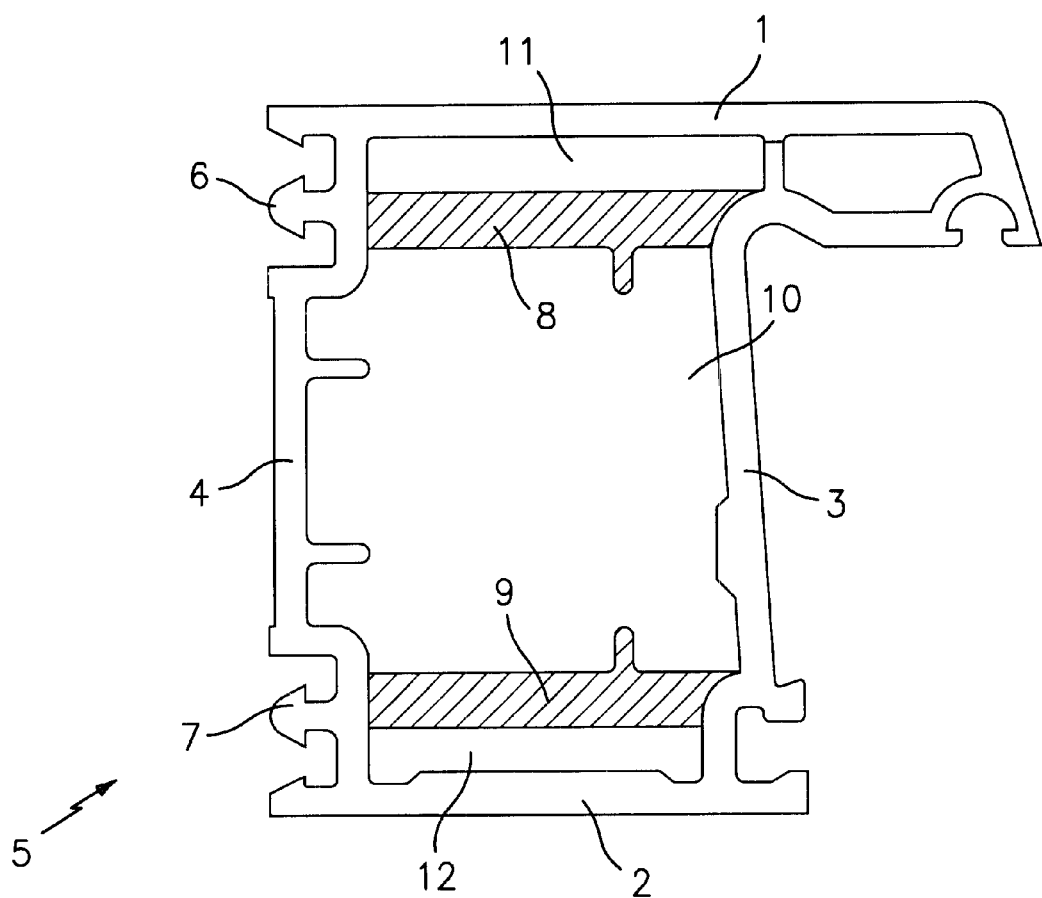
FIG. 1: shows a cross-section through a section manufactured using the method in accordance with the invention.

FIG. 1 shows a cross-section through the section in accordance with the invention. The section consists of an external surface 1 and an internal surface 2 which form the section 5 with a glazing side 3 and a wall side 4. On the wall side 4, detents 6 and 7 are provided which can be engaged in a secondary section.

Webs 8, 9 are provided both behind the external surface 1 and behind the internal surface 2 which webs form the chambers 11, 12 with the external surface 1 or the internal surface 2. Between the webs 8, 9, there is located a steel plating 10 which provides the required stability to the total section. The chambers 11, 12 are filled with air and form additional insulation between the external surface 1 and the internal surface 2.

The webs 8, 9 consist of a foamed material. Preferably, a hard PVC plastic is used here as the material.

Figure 2:
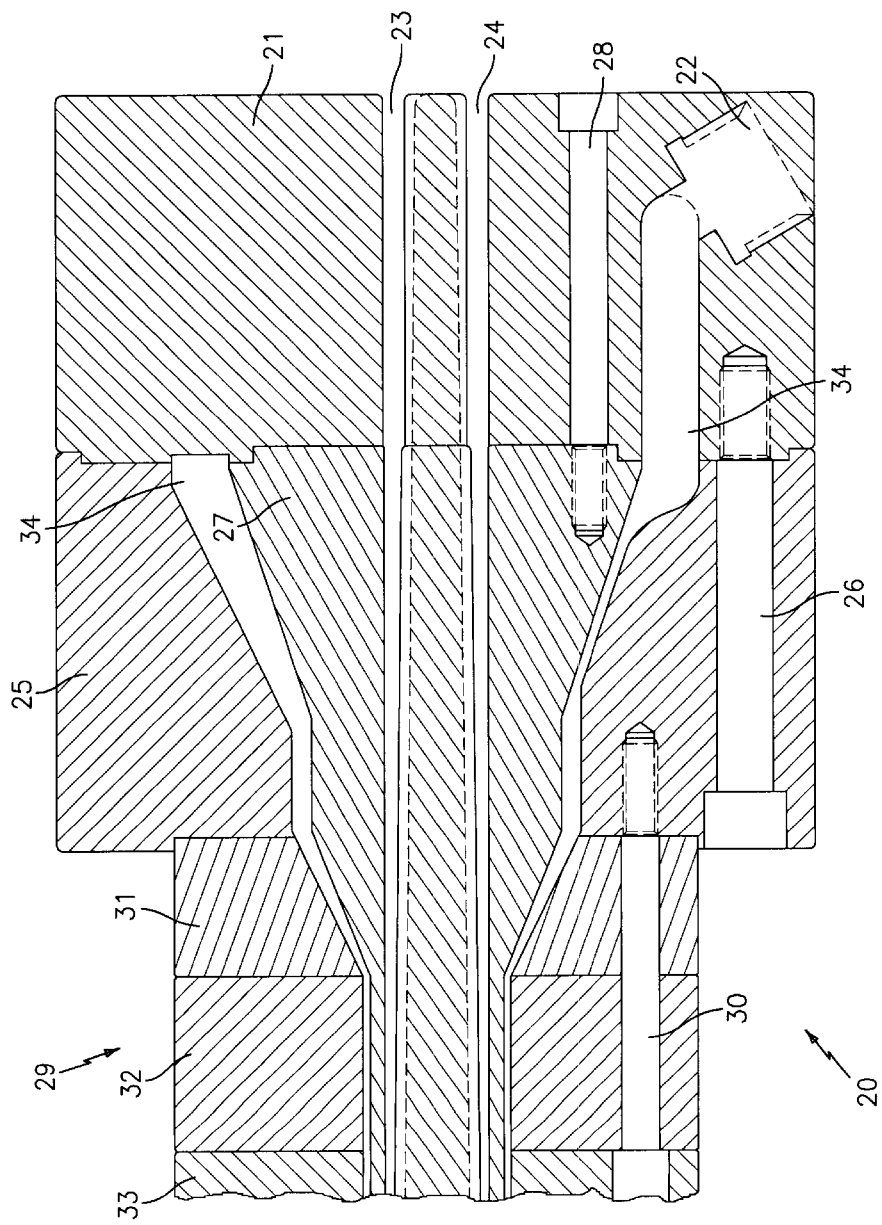
FIG. 2: shows a cross-section through a tool for the manufacture of the section in accordance with the invention of FIG. 1.

FIG. 2 shows a cross-section through a tool for the manufacture of the section in accordance with the invention of FIG. 1. The tool 20 consists of a cardioid 21 in which a connection 22 for an extruder is introduced. The cardioid possesses openings 23, 24 into each of which a web consisting of a foamed material can be introduced. The cardioid 21 is screwed to a retention ring 25 by means of screws 26. Located in the retention ring 25 is the core 27 which is screwed to the cardioid 21 by means of screws 28. Before the retention ring 25, a top plate 29 is fixed in place by means of screws 30 which top plate consists of a tightening plate 31 and two further plates 32, 33.

To manufacture a section in accordance with FIG. 1, the plasticized plastic mass is extruded via the extruder connected to the connection 22. Due to the damming effect in the region of the retention ring 25, the plastic mass is distributed evenly in the flow channel 34 within the cardioid 21. In the region of the tightening plate 31, the plastic mass is further compressed while a settling of the material occurs in the region of the plates 32, 33. Behind the plate 33, the material exits the tool 20 in the form of the section shown in FIG. 1.

Parallel to the extrusion of the extruder connected to the connection 22, two webs each consisting of a foamed hard PVC plastic are introduced via the opening 23, 24. Before the openings 23, 24 in this process, either another extruder line or a magazine could be located which magazine supplies webs already completely extruded. The webs introduced run through the tool and weld behind the plate 33 with the section exiting the tool. In this process, while the exit temperature of the webs from the tool must be sufficient for the webs to weld to the section, it must not be so high that the section becomes too hot and so deforms due to the webs introduced. It is anyway not possible to cool the webs sufficiently quickly even with water cooling of the section after the tool, as these are located on the inside of the section inaccessibly for water cooling.

To achieve the correct exit temperature of a web from the tool, it must further be remembered that the webs introduced heat up while they run through the tool. However, it has been found that with webs introduced into the tool at room temperature, an exit temperature is achieved which meets the demands given above. If, therefore, an additional extrusion line for the webs is set up in front of the tool, this line must possess a cooling path which cools down the webs accordingly.

Figure 3:
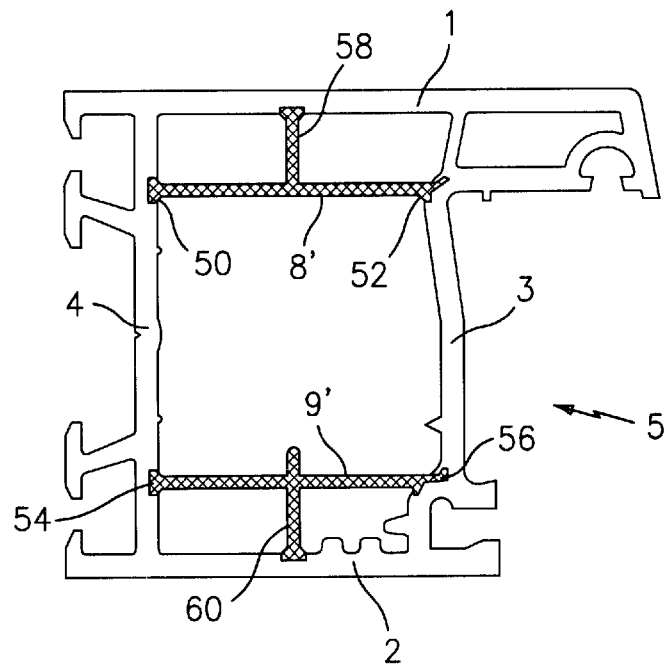
FIG. 3: shows a further cross-section through a section manufactured in accordance with a method in accordance with the invention.

FIG. 3 shows a section 5 with an external surface 1 and an internal surface 2 of a glazing side 3 and a wall side 4. The webs 8' and 9' provided for this section are welded in each case by their side edges 50 and 52 or 54 and 56 on the one side to the wall side 4 and on the other side to the glazing side 3 of the section 5. In addition, the webs 8' and 9' possess a roughly centrally located web 58 or 60 extending perpendicular thereto. The web 58 is welded by its free side edge to the external surface 1 of the section 5 and the section 60 is welded by its free side edge to the internal surface 2.

Figure 4:
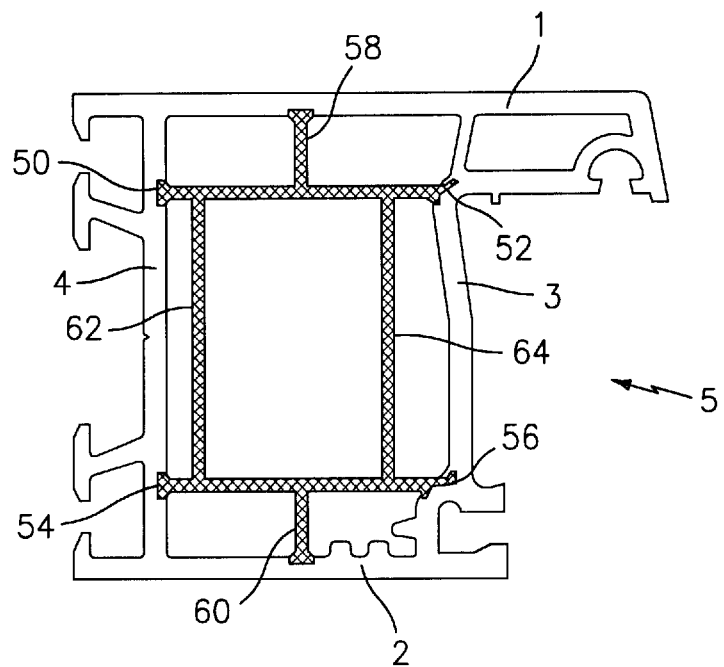
FIG. 4: shows a third cross-section of a section manufactured with the method in accordance with the invention.

FIG. 4 shows a section 5 which differs slightly from that in FIG. 3. Here, the webs 8' and 9' are connected to each other again by transversely extending walls 62 and 64 in such a way that in total one cohesive inside section is produced which consists of the webs 8' and 9' with its perpendicular webs 58 and 60 and the connecting webs 62 and 64.

The closed inside section of FIG. 4 is also extruded in a first extruder line and subsequently cooled. It is then introduced into a tool forming the section in which tool the section 5 with the external surface 1 and the internal surface 2 as well as the glazing size surface 3 or the wall side surface 4 is also extruded. To obtain a secure weld between the inside section and the outside section, the side edges of the inside section are heated again by means of a hot-air blower to such an extent that a secure weld is made possible. Instead of the hot-air nozzles, heating cartridges could also be provided to heat up the side edges.

What is claimed is:

1. A method for the manufacture of a section for windows or doors having an external surface and an opposite internal surface and having at least one web being a rigid, wall structure possessing rigidity and extensions in all three dimensions and which divides a chamber defined between the external surface and the internal surface, comprising the following steps:
    extruding the at least one web in a first extruder line;
    at least partially cooling the at least one web exiting the first extruder line;
    introducing the at least partially cooled web into a tool for forming the section;
    forming the section with the external and internal surfaces in the tool connected to a second extruder line; and
    welding the at least one web to a section part forming the external or internal surface in the tool during exit from the tool.

2. A method in accordance with claim 1, additionally comprising heating the at least one web by the tool to a temperature at which the web possesses sufficiently high stability to be weldable to the section part.

3. A method in accordance with claim 2, wherein the at least one web is constituted by foamed material.

4. A method in accordance with claim 3, additionally comprising
    cooling the at least one web after exiting the first extruder line and heating the web at least a region of side edges which are to be connected to the section part forming the external or internal surfaces so that the at least one web is welded to the section part forming the external or internal surfaces.

5. A method in accordance with claim 2, additionally comprising
    cooling the at least one web after exiting the first extruder line and heating the web at least in a region of side edges which are to be connected to the section part forming the external or internal surfaces so that the at least one web is welded to the section part forming the external or internal surfaces.

6. A method in accordance with claim 1, wherein the at least one web is constituted by foamed material.

7. A method in accordance with claim 6, additionally comprising cooling the at least one web after exiting the first extruder line and heating the web at least a region of side edges which are to be connected to the section part forming the external or internal surfaces so that the at least one web is welded to the section part forming the external or internal surfaces.

8. A method in accordance with claim 6, wherein the web is constituted by hard PVC plastic.

9. A method in accordance with claim 1, additionally comprising cooling the at least one web after exiting the first extruder line and heating the web at least in a region of side edges which are to be connected to the section part forming the external or internal surfaces so that the at least one web is welded to the section part forming the external or internal surfaces.

10. A method in accordance with claim 9, wherein the at least one web is heated by the tool to a temperature at which the web possesses sufficiently high stability to be weldable to the section part.

11. A method in accordance with claim 9, wherein the at least one web is substantially cooled to room temperature.

12. A method in accordance with claim 9, wherein the region of the side edges are heated in the tool by a hot-air blower or heating cartridges.

13. A method in accordance with claim 9, wherein the at least one web is cooled down along a cooling path in the first extrusion line.

14. A method in accordance with claim 1, wherein the section with the external and internal surfaces is formed in the tool by extruding a plasticized mass thereinto via the second extruder line.

15. A method in accordance with claim 1, wherein the at least partially cooled web is immediately introduced into the tool directly from the first extruder line.

16. A method in accordance with claim 1 wherein the at least partially cooled web (8,9) is introduced into the tool (20) for forming the section and directly connected (23,24) to the first extruder line.

17. A method for the manufacture of a section for windows or doors having an external surface and an opposite internal surface and having at least one interior section being a rigid, wall structure possessing rigidity and extensions in all three dimensions and which divides a chamber defined between the external surface and the internal surface, comprising the following steps:

extruding the interior section in a first extruder line;

at least partially cooling the interior section exiting the first extruder line;

introducing the at least partially cooled interior section into a tool for forming the section for windows and doors;

forming the section with the external and internal surfaces in the tool connected to a second extruder line; and welding the interior section to a section part forming the external or internal surface in the tool during exit from the tool.

18. A method in accordance with claim 17, comprising heating the interior section by the tool to a temperature at which the interior section possesses sufficiently high stability to be weldable to the section part.

19. A method in accordance with claim 17 wherein the interior section is constituted by foamed material.

20. A method in accordance with claim 19, wherein the interior section is constituted by hard PVC plastic.

21. A method in accordance with claim 17, additionally comprising cooling the interior section after exiting the first extruder line and heating the interior section at least in a region of side edges which are to be connected to the section part forming the external or internal surfaces so that the interior section is welded to the section part forming the external or internal surfaces.

22. A method in accordance with claim 17, wherein the interior section is substantially cooled to room temperature.

23. A method in accordance with claim 17, wherein the region of the side edges are heated in the tool by a hot-air blower or heating cartridges.

24. A method in accordance with claim 17, wherein the section with the external and internal surfaces is formed in the tool by extruding a plasticized mass thereinto via the second extruder line.

25. A method in accordance with claim 17, wherein the interior section is cooled down along a cooling path in the first extrusion line.

26. A method in accordance with claim 17, wherein the cooled interior section is immediately introduced into the tool directly from the first extruder line.

27. A method in accordance with claim 17 wherein the at least partially cooled interior section (8,9) is introduced into the tool (20) for forming the section and directly connected (23,24) to the first extruder line.

* * * * *

UNITED STATES PATENT AND TRADEMARK OFFICE
CERTIFICATE OF CORRECTION

PATENT NO.   : 6,478,916 B1
DATED        : November 12, 2002
INVENTOR(S)  : Norbert Funke and Rudolf Poljanac It is certified that error appears in the above-identified patent and that said Letters Patent is hereby corrected as shown below:

<u>Title page,</u>
Item [73], change Assignee to read:
-- [73]  Assignee: Funke Kunststoffe GmbH,
                   Sendenhorst (DE) --.

Signed and Sealed this

Seventh Day of October, 2003

JAMES E. ROGAN
*Director of the United States Patent and Trademark Office*